United States Patent
Huber et al.

(10) Patent No.: US 8,037,955 B2
(45) Date of Patent: Oct. 18, 2011

(54) METHOD FOR OPERATING A HYBRID VEHICLE

(75) Inventors: Thomas Huber, Daisbach (DE);
Jens-Werner Falkenstein, Aalen (DE)

(73) Assignee: Robert Bosh GmbH, Stuttgart (DE)

( * ) Notice: Subject to any disclaimer, the term of this patent is extended or adjusted under 35 U.S.C. 154(b) by 498 days.

(21) Appl. No.: 12/097,644

(22) PCT Filed: Sep. 18, 2006

(86) PCT No.: PCT/EP2006/066443
§ 371 (c)(1),
(2), (4) Date: Oct. 27, 2008

(87) PCT Pub. No.: WO2007/071464
PCT Pub. Date: Jun. 28, 2007

(65) Prior Publication Data
US 2009/0090572 A1    Apr. 9, 2009

(30) Foreign Application Priority Data
Dec. 20, 2005  (DE) .......................... 10 2005 060 858

(51) Int. Cl.
*B60W 10/06* (2006.01)
(52) U.S. Cl. ................. 180/65.28; 180/65.285
(58) Field of Classification Search ............. 180/65.28, 180/65.23, 65.27, 65.21, 65.285, 65.26; 701/22, 701/102, 84; 123/295, 319; 903/903, 918, 903/917
See application file for complete search history.

(56) References Cited

U.S. PATENT DOCUMENTS

| | | | |
|---|---|---|---|
| 5,939,794 A * | 8/1999 | Sakai et al. | 903/903 |
| 6,047,681 A | 4/2000 | Scherer et al. | |
| 6,209,672 B1 * | 4/2001 | Severinsky | 180/65.23 |
| 6,301,529 B1 * | 10/2001 | Itoyama et al. | 701/22 |
| 6,581,565 B2 * | 6/2003 | Heslop et al. | 123/295 |
| 6,704,638 B2 * | 3/2004 | Livshiz et al. | 701/102 |
| 7,027,908 B2 * | 4/2006 | Esteghlal | 701/110 |
| 7,051,703 B2 * | 5/2006 | Wenzler | 123/319 |
| 7,392,871 B2 * | 7/2008 | Severinsky et al. | 180/65.28 |

(Continued)

FOREIGN PATENT DOCUMENTS

DE    19630213    7/1997

(Continued)

OTHER PUBLICATIONS

International Search Report, PCT International Patent Application No. PCT/EP2006/066443, dated Dec. 15, 2006.

*Primary Examiner* — Hau Phan
(74) *Attorney, Agent, or Firm* — Kenyon & Kenyon LLP (57) ABSTRACT

A method for operating a hybrid drive having at least one first and one second drive-connected drive machine, in which an actual torque of at least one of the drive machines is influenced by a reference-forming element in that, from a combined setpoint torque, a first setpoint torque is formed for a slow influencing path and a second setpoint torque is formed for a fast influencing path for the first drive machine and a setpoint torque is generated for a fast influencing path of the second drive machine. A provision is made for the lead setpoint torque for influencing the slow influencing path of the first drive machine to be obtained from the unfiltered combined setpoint torque before the combined setpoint torque is processed in the reference-forming element.

12 Claims, 5 Drawing Sheets

U.S. PATENT DOCUMENTS

| | | | |
|---|---|---|---|
| 7,400,962 B2 * | 7/2008 | Maier-Landgrebe | 701/84 |
| 7,455,134 B2 * | 11/2008 | Severinsky et al. | 180/65.28 |
| 7,597,164 B2 * | 10/2009 | Severinsky et al. | 180/65.27 |
| 2002/0117339 A1 | 8/2002 | Nakashima | |
| 2007/0240921 A1 * | 10/2007 | Katzenberger et al. | 180/65.2 |
| 2007/0250239 A1 | 10/2007 | Roudeau et al. | |

FOREIGN PATENT DOCUMENTS

| | | |
|---|---|---|
| DE | 10261278 | 7/2004 |
| EP | 0962352 | 12/1999 |
| EP | 1275551 | 1/2003 |
| FR | 2870792 | 12/2005 |

* cited by examiner

METHOD FOR OPERATING A HYBRID VEHICLE

FIELD OF THE INVENTION

The present invention is based on a method for operating a hybrid vehicle.

BACKGROUND INFORMATION

Recently, the reduction of emissions and fuel consumption resulted in the further development of hybrid drives for motor vehicles. The aim is to operate the combustion engine in the range of favorable efficiency factors, to switch it off when the vehicle is at a standstill or at low vehicle speeds, and to drive electrically and to utilize braking energy by recuperation. For example, in parallel hybrids the torques of the combustion engine and of one or multiple electric machines are added. The electric machines are connected, e.g., as starter generators to the belt drive or to the crankshaft of the combustion engine.

Rapid load changes or switching operations may induce a bucking movement in the vehicle, in which typically the engine's rotating mass together with the transmission's rotating mass swings against the reduced vehicle mass. In addition, other forms of oscillation are possible as well. Conventional methods for reducing bucking oscillations are based on avoiding the excitation of the drive train by rapid load changes. For this purpose, in the event of rapid changes, the torque requested by the driver via the accelerator pedal is low-pass filtered by reference-forming elements or its rate of change is limited. This causes a delay in torque generation and torque reduction.

In addition, measures are taken in the zero crossing of the drive torque, e.g., in the transition from the overrun state to the acceleration state. The associated zero crossing of the reaction torque causes the engine-transmission unit to tip in the bearings. In addition, mechanical plays or slacks existing in the drive train are traversed. For reasons of comfort, this transition should be "smooth", which is achieved by a gradient limitation of the drive torque during its passage through zero. This is also the task of the reference-forming element.

Figure 1:
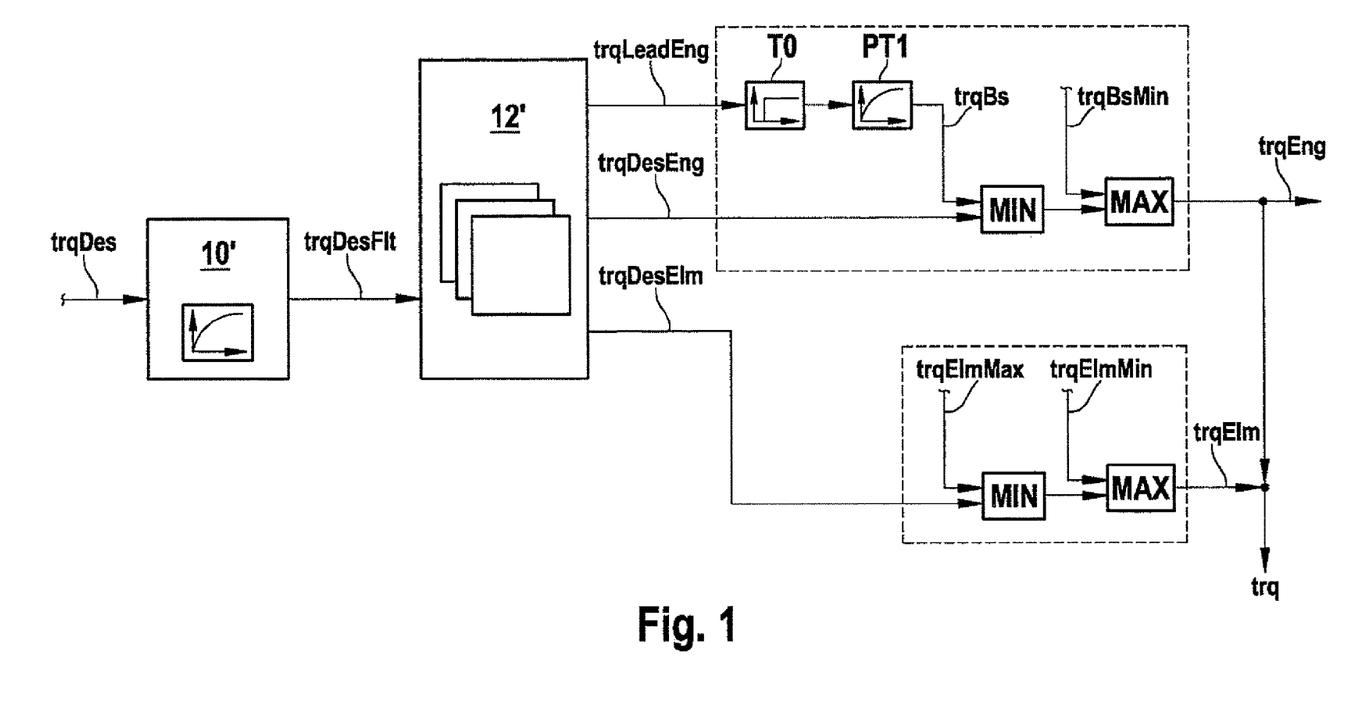
FIG. 1 shows a conventional schema of a reference-forming element of a hybrid drive control system.

For a better understanding of the present invention, the related art is shown in FIG. 1. In hybrid drives, multiple power units, usually one combustion engine and one or more electric machines, together form the drive torque and must be coordinated accordingly by reference-forming element 10'. In the parallel hybrid having a crankshaft starter generator (the flywheel of the combustion engine is coupled with the electric machine, i.e. the crankshaft starter generator), a tipping of the engine-transmission unit is caused by the zero crossing of the combined torque trq of the combustion engine and the electric machine. Mechanical slacks are also traversed in the process. Thus, reference-forming element 10' would be able to filter the combined setpoint torque trqDes prior to the actual operating strategy, cf. FIG. 1. The distribution of the filtered combined setpoint torque trqDesFlt to the setpoint torques trqLeadEng, trqDesEng of the combustion engine and trgDesElm of the electric machine would then occur, in light of energetic and emission considerations, in operating strategy block 12'.

Modern Otto engines having a manifold injection system usually have an electronic throttle valve for regulating the air mass flow. The accelerator pedal is mechanically decoupled from the electronic throttle valve. The finite adjusting speed of the throttle valve actuator and dynamic filling effects in the intake manifold do not allow for a highly dynamic adjustment of a specified air mass flow and of the combustion engine torque produced thereby. An intervention in the ignition angle and an associated reduction of the combustion engine torque, by contrast, may occur nearly without delay. Thus two paths are available for controlling the torque. For each of these two paths, an associated setpoint torque may be specified.

The lead setpoint torque trqLeadEng for the combustion engine, shown in FIG. 1, acts on the slow air path of the combustion engine. The air mass flow is adjusted accordingly. At an optimum ignition angle, the combustion engine would produce a torque trqBs known as a base torque. In stationary operation, base torque trqBs approximately corresponds to lead setpoint torque trqLeadEng. In non-stationary operation, dynamic filling effects are active in the intake manifold, the transmission of lead setpoint torque trqLeadEng onto base torque trqBs being approximately describable using the series connection of a dead-time element (TO) and a time-delay element of the first order (Ptl).

The second setpoint torque trqDesEng shown in FIG. 1 for the combustion engine acts on the fast ignition angle path. An ignition retard of the ignition angle with respect to the optimum ignition angle deteriorates the efficiency factor of the engine, and the actual torque trqEng of the combustion engine is reduced with respect to base torque trqBs.

The model in FIG. 1 shows the correlations in a simplified manner. The setpoint torque for the combustion engine trqDesEng is limited to a range between base torque trqBs and a minimum base torque trqBsMin and yields the actual torque trqEng of the combustion engine. The time delay in the ignition angle intervention is small and is disregarded in the model. Base torque trqBs corresponds to the actual torque trqEng of the combustion engine, which results at the optimum ignition angle. Minimum base torque trqBsMin is lower than the base torque and corresponds to the actual torque trqEng in the event of a maximum ignition retard.

In the case of a diesel engine, in particular a turbocharged diesel engine, the torque control may also be divided into a slow path having a lead setpoint torque trqLeadEng and a fast path having a setpoint torque trqDesEng, cf. DE19630213 C1.

The engine control system of a modern combustion engine is able to ascertain the current actual torque trqEng and the base torque trqBs on the basis of measured or estimated variables, in a gasoline engine having manifold injection, e.g., from the engine speed, the intake manifold pressure, ignition timing and air ratio λ.

The torque control system of modern electric machines has a much higher dynamics in comparison to the slow path of the torque control system of a combustion engine. In the model shown in FIG. 1, the delay in the torque control of the electric machine is neglected, the actual torque trqElm resulting from setpoint torque trqDesElm by limitation to torque limits trqElmMax and trqElmMin. The torque limits of the electric machine are ascertained on the basis of the current operating states of the electric machine, of one or more electrical energy stores and one or more vehicle electrical systems.

The method of reference formation shown in FIG. 1 works as long as both power units have a similar behavior in the dynamics of the torque control. This is the case on account of the high dynamics of the electric machine if the torque of the combustion engine is influenced via the fast path trqDesEng.

If the torque of the combustion engine is determined by the slow path, e.g., in the case of rapidly rising setpoint torques and a delayed rising base torque trqBs, which limits the actual torque trqEng (i.e. trqDesEng>trqBs), then the following problems result:

1. The dynamics of the actual torque trqEng and thus of the combined actual torque trq are reduced due to the series connection of two delays, namely, the filtering process in reference-forming element 10' and the slow path in the combustion engine (intake manifold dynamics, turbo lag). The dynamics of the slow path depend heavily on the operating point of the combustion engine, i.e., torque, rotational speed, intake manifold pressure etc., such that a consideration/compensation in operating strategy block 12' would be possible only in a limited way.
2. Due to the varying dynamics in the torque control of the two power units, combined actual torque trq greatly deviates in non-stationary operation from filtered combined setpoint torque trqDesFlt. In addition, the deviation varies depending on the currently chosen torque distribution (operating strategy). A limitation of the gradient of trqDesFlt in the zero crossing then does not result in the limitation of the gradient of trq in its zero crossing, which affects the driving comfort negatively.

SUMMARY

In a motor vehicle drive having at least two drive machines, a method according to an example embodiment of the present invention allows for a precise formation of the combined actual torque, in particular in the zero crossing, even in the case of a strongly varying dynamics in the torque control on one of the drive machines, in particular of a combustion engine, so as to raise the driving comfort. In addition, by suitable use of the other drive machine, in particular an electric machine, high torque dynamics are achieved in the drive, ignition angle interventions being minimized, which in addition to efficiency factor losses at high load may result in temperature spikes in the catalytic converter of the vehicle and may shorten its service life.

According to the example embodiment of the present invention, the unfiltered combined setpoint torque is used as a basis for the distribution to the power units (operating strategy block). The distribution provides the lead setpoint torque for the slow path of the combustion engine. Thus, the lead setpoint torque is not additionally delayed by the reference-forming element, which allows for a high dynamics of the drive. The lead setpoint torque for influencing the slow influencing path of the first drive machine is obtained from the unfiltered combined setpoint torque before the combined setpoint torque is processed in the reference-forming element. The slow influencing path is the air path in the case of a combustion engine, while the fast influencing path causes an ignition angle adjustment. As the second drive machines the electric machine has a fast influencing path since fundamentally it has a high dynamics.

In an advantageous method step, the reference-forming element is supplied with an unfiltered setpoint torque of the second drive machine and the unfiltered lead setpoint torque of the first drive machine as input values.

In an advantageous method step, the reference-forming element ascertains the setpoint torque for the fast (ignition angle) path of the combustion engine and the setpoint torque for the electric machine by taking into account the current base torque signaled by the one drive machine, in particular the combustion engine. Due to the high dynamics of the fast (ignition angle) path and of the electric machine, the combined actual torque may be adjusted precisely even in non-stationary operation. The characteristic curve of the combined actual torque, in particular the gradient in the zero crossing, may be specified precisely, in conjunction with low load-alteration effects and a high driving comfort.

The method is simplified if the unfiltered lead setpoint torque of the first drive machine leaves the reference-forming element unmodified. A suitable modification may be advantageous, however, in order, e.g., to minimize interventions in the ignition angle during the zero crossing of the combined torque.

In another advantageous method step, the reference-forming element ascertains the setpoint torque for the fast path of the first drive machine and the setpoint torque of the second drive machine by taking into account a current base torque signaled by the first drive machine.

In another advantageous method step, the second setpoint torque for the first drive machine (fast path) is set to equal the base torque if no fast intervention, in particular no ignition angle adjustment, is required in the first drive machine.

Alternatively, if a fast intervention in the first drive machine is required, the second setpoint torque for the first drive machine results as the sum of the base torque and a differential torque that is characteristic of an influence of the fast influencing path.

In another advantageous method step, the reference-forming element specifies the setpoint torques in such a way that a gradient of the actual torque lies within admissible thresholds. The limitation of the gradient is able to prevent an excitation of an oscillation of the drive train caused by fast load alterations.

In the range of a zero crossing of the actual torque, the thresholds for limiting the gradient are preferably selected to be small. A comfortable, smooth transition, e.g., from an overrun state to an acceleration state may thus be achieved.

In an advantageous method step, the setpoint torque for the second drive machine may be selected in such a way that the second setpoint torque of the first drive machine is equal to the base torque. This is advantageously the case if an intervention on the fast influencing path of the first machine, in particular an ignition angle intervention, is to be avoided and there is no torque limitation of the second drive machine.

If there is a torque limitation of the second drive machine, then the first drive machine may be advantageously influenced in addition on the fast influencing path (second setpoint torque). An intervention in the ignition angle may be practical even without limiting the torque of the second drive machine if a torque is to be limited in the latter, for example, in order to limit in the case of an electric machine the current rise rates of an energy store and thus to extend its service life.

BRIEF DESCRIPTION OF THE DRAWINGS

Additional specific embodiments, aspects and advantages of the present invention also derive, independently of their combination, without limiting the universality, from an exemplary embodiment of the present invention presented below with reference to figures.

DETAILED DESCRIPTION OF EXAMPLE EMBODIMENTS

An exemplary embodiment of the present invention is shown in FIGS. 2 through 5.

Figure 2:
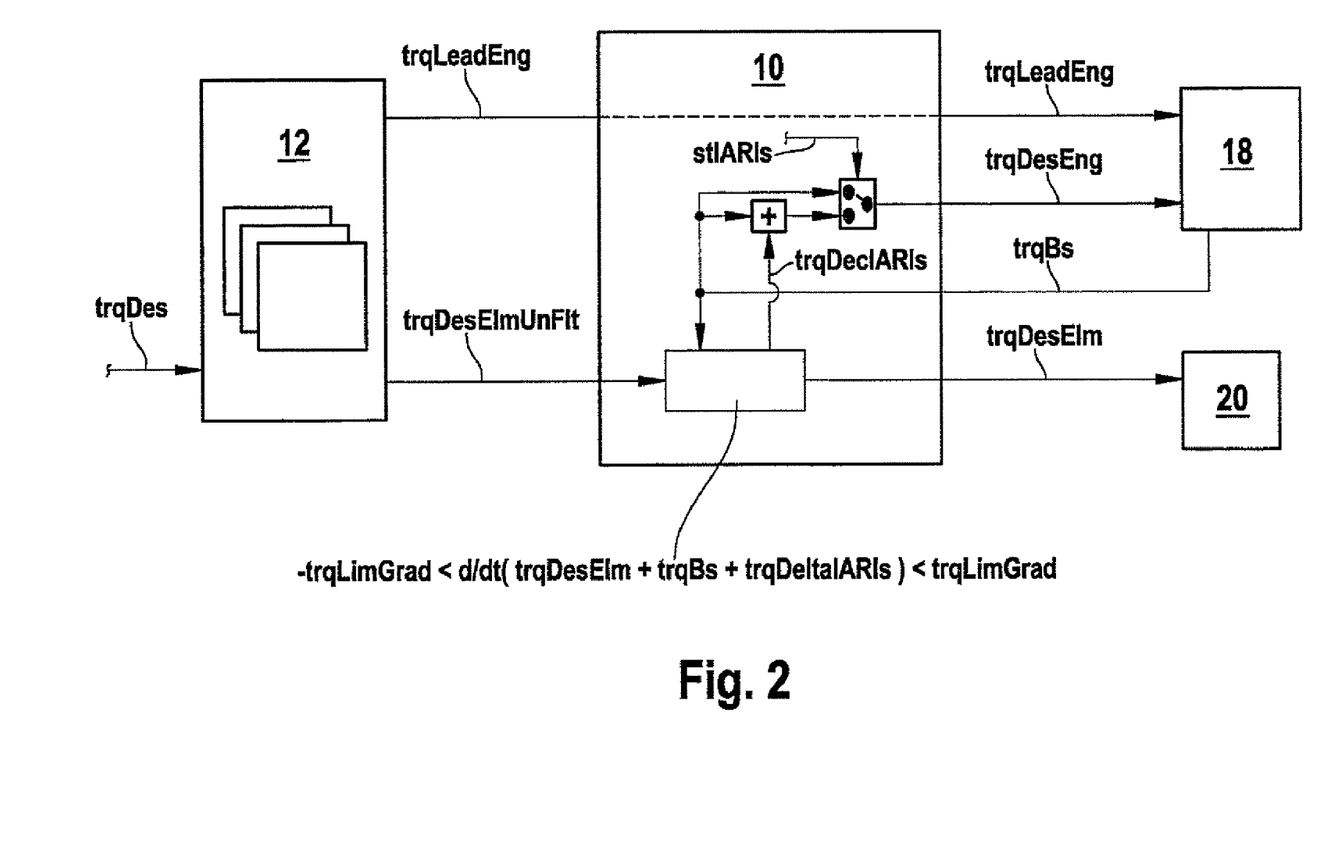
FIG. 2 shows a schema of a preferred reference-forming element of a hybrid drive control system according to an example embodiment of the present invention.

A combustion engine 18, e.g., an Otto engine, is equipped, by way of example, with a manifold injection system, an electronic accelerator pedal (e-gas, electronic throttle valve) and a catalytic converter. The flywheel of the combustion engine is coupled with an electric machine 20 (crankshaft starter generator), and the actual torques trqEng of combustion engine 18 and trqElm of electric machine 20 add up to form actual torque trq of the drive as a whole, i.e. to form the combined torque of combustion engine 18 and electric machine 20.

An operating strategy block 12 distributes the combined setpoint torque trqDes requested by the driver or by comfort functions to the lead setpoint torque trqLeadEng for combustion engine 18 and to the unfiltered setpoint torque trgDesElmUnFlt of electric machine 20 in light of energetic and emission considerations (FIG. 2).

For reasons of clarity, no modification of the lead setpoint torque trqLeadEng in the block of a preferred reference-forming element 10 occurs in the exemplary embodiment. A respective modification may be advantageous, e.g., in order to minimize interventions in the ignition angle during the zero crossing of combined torque trq.

Base torque trqBs follows lead setpoint torque trqLeadEng in delayed fashion due to the intake manifold dynamics (modeled as a dead-time element and delay element of the first order PT1) and is transmitted to reference-forming element 10. Reference-forming element 10 influences setpoint torques trqDesEng and trqDesElm. If no ignition angle intervention is required, then setpoint torque trqDesEng for combustion engine 18 is set to base torque trqBs:

trqDesEng=trqBs

Actual torque trqEng of combustion engine 18 then approximates base torque trqBs and thus the setpoint torque:

trqEng=trqDesEng=trqBs.

Due to the high dynamics of electric machine 20, actual torque trqElm approximates setpoint torque trqDesElm provided electric machine 20 is not at the torque limits:

trqElm=trqDesElm

For the actual torque trq=trqEng+trgElm of the drive as a whole, the following holds approximately:

$$trq=trqDesEng+trqDesElm=trqBs+trqDesElm \quad (1)$$

If an ignition angle intervention is necessary, then the status bit stlARls=true is set, and setpoint torque trqDesEng of combustion engine 18 results from the sum of base torque trqBs and a differential torque trqDeclARls (negative), which characterizes the influence of the ignition retard:

trqDesEng=trqBs+trqDeclARls

Due to the high dynamics of the ignition angle intervention, the actual torque trqEng of combustion engine 18 approximates setpoint torque trqDesEng:

trqEng=trqDesEng=trqBs+trqDeclARls

For the actual torque trq=trqEng+trgElm of the drive as a whole, the following then holds:

$$trq=trgDesEng+trqDesElm=trqBs+trqDeclARls+trqDesElm \quad (2)$$

Reference-forming element 10 specifies the setpoint torques in such a way that for the gradient, i.e., the derivative of actual torque trq with respect to time:

$$-trqLimGrad < d/dt(trq) < trgLimGrad \quad (3)$$

where $$d/dt(trq)=d/dt(trqDesEng+trqDesElm). \quad (4)$$

Reference-forming element 10 of the exemplary embodiment first attempts to avoid an intervention in the ignition angle and to select setpoint torque trqDesElm for electric machine 20 accordingly. In this case, for equations (3), (4):

trqDesEng=trqBs

If this is not possible on account of a torque limitation trqElmMin of electric machine 20, an intervention in the ignition angle is performed in addition such that for equations (3), (4):

trqDesEng=trqBs+trqDeclARls trqDesElm=trqElmMin

Alternatively, it may be practical to use ignition angle interventions even if electric machine 20 is not yet at the torque limitation, e.g., in order to limit the torque gradients on electric machine 20 and thus for service life reasons the current rise rates of an electric energy store.

In the range of the zero crossing of actual torque trq, gradient limit trqLimGrad is selected to be small in order to achieve a smooth transition e.g. from the overrun state to the acceleration state.

Figure 3:
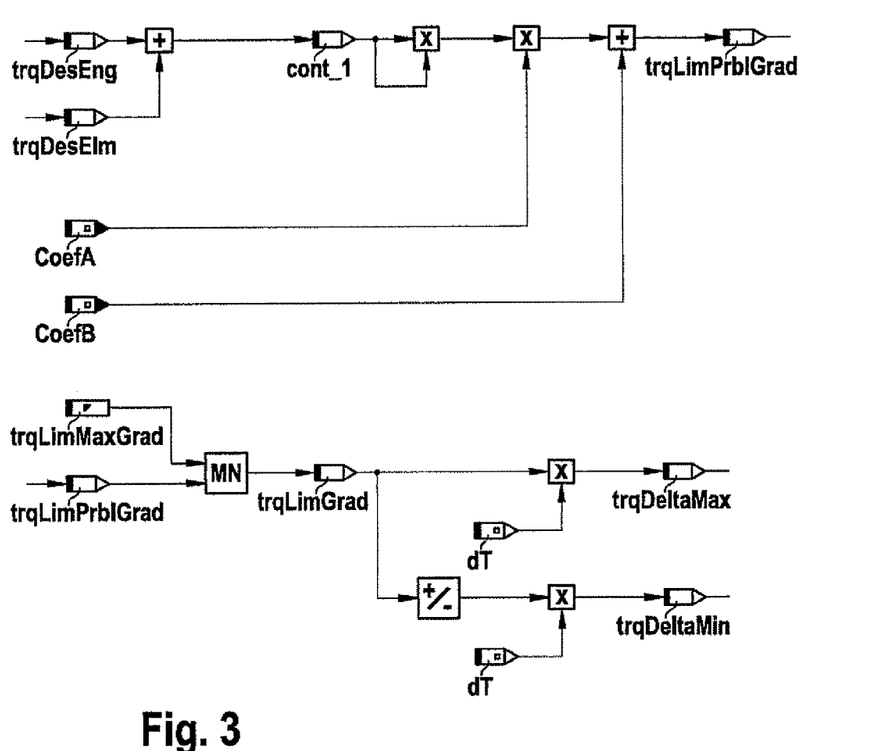
FIG. 3 shows a sequence of a calculation of a gradient limit trgLimGrad.
Figure 4:
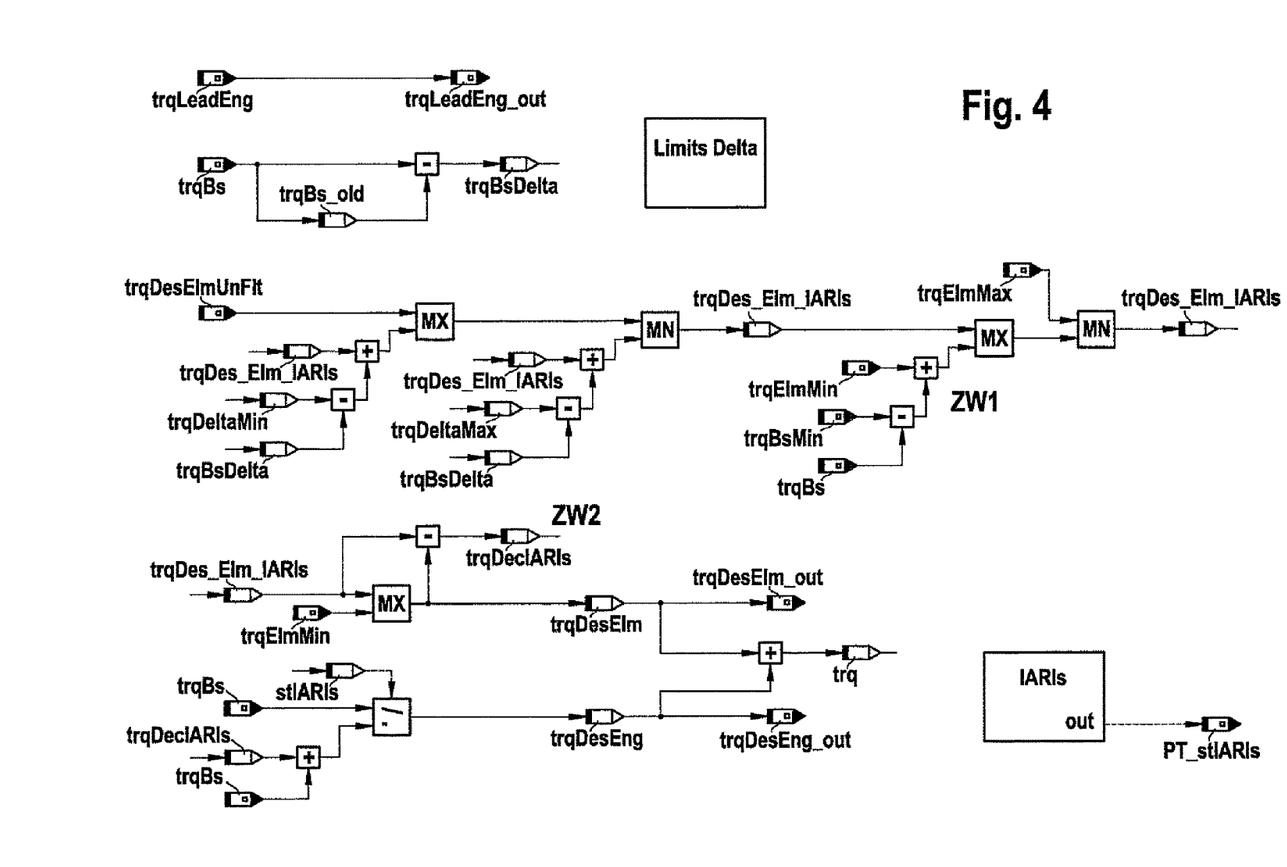
FIG. 4 shows another calculation sequence.

FIGS. 3 and 4 show an example of an implementation. FIG. 3 depicts the calculation of gradient limit trqLimGrad. The variable trqLimPrblGrad is obtained by a parabolic correlation from actual torque trq:

trqLimPrblGrad=CoefAtrg2+CoefB where trq=trqDesEng+trqDesElm, trqLimPrblGrad thus assuming the value of CoefB at trq=0 and increasing accordingly at trq>0 or at trq<0.

Gradient limit trqLimGrad results from trqLimPrblGrad by minimum formation using the variable trqLimMaxGrad and is thus limited to the value of trqLimMaxGrad even in the case of a strongly positive or strongly negative actual torque trq. This results in a gradient limitation of actual torque trq that is effective over the entire torque range in order to prevent an oscillation excitation of the drive train by rapid load changes.

The magnitudes CoefA, CoejB and trqLimMaxGrad are parameters that allow for an adaptation to a particular vehicle type if the appropriate data are supplied.

The algorithm is implemented by discretization. By multiplication with the variable dT, which characterizes the sampling time (i.e. the sampling period duration, the time between two calculation cycles), gradient limit trqLimGrad yields the allowed changes trqDeltaMax and trqDeltaMin for the combined actual torque trq between two samplings.

The setpoint torque trqDesElm for electric machine 20 results from the variable trgDes_Elm_IARls. The setpoint value for the variable trqDes_Elm_IARls is the unfiltered setpoint torque trqDesElmUnFlt, demanded by the operating strategy, for electric machine 20 (cf. FIG. 2).

Thus, in stationary operation trqDesElm=trqDes_Elm_IARls=trqDesElmUnFlt sets in, i.e., electric machine 20 produces the setpoint torque specified by the operating strategy, and no ignition angle intervention occurs.

In this instance, changes of the variable trqDes_Elm_IARls are chosen to be such that the previously calculated allowed changes of combined actual torque trq are maintained. For this purpose, as shown in FIG. 4, first the change trqBsDelta of base torque trqBs between two samplings is ascertained (FIG. 4). The variable trqBsDelta is subtracted from the allowed changes trqDeltaMax and trqDeltaMin for combined actual torque trq. This yields the allowed changes for the variable trgDes_Elm_IARls.

If variable trqDes_Elm_IARls falls below the lower torque limit trqElmMin of electric machine 20, then additionally an ignition retard ZW2 is implemented via differential torque trqDeclARls.

The lower limit of variable trqDes_Elm_IARls thus results from the lower torque limit trqElmMin of electric machine 20 and the maximum ignition retard ZW1. The upper limit of variable trgDes_Elm_IARls results from the upper torque limit trqElmMax of electric machine 20.

Furthermore, a value trqLeadEng_out is generated from trqLeadEng.

As already shown, the algorithm of the exemplary embodiment first attempts to set torque trgDes_Elm_IARls using electric machine 20. If this does not succeed as a result of a torque limit trqElmMin of electric machine 20, then additionally an ignition retard ZW2 is implemented via differential torque trqDeclARls:

trgDeclARls=trgDes_Elm_IARls-MAX(trgDes_Elm_IARls, trqElm

When trqDeclARls<0, the ignition angle status bit is set to stlARls=true, it being the case that for trqDeclARls=0, stlARls=false.

Figure 5:
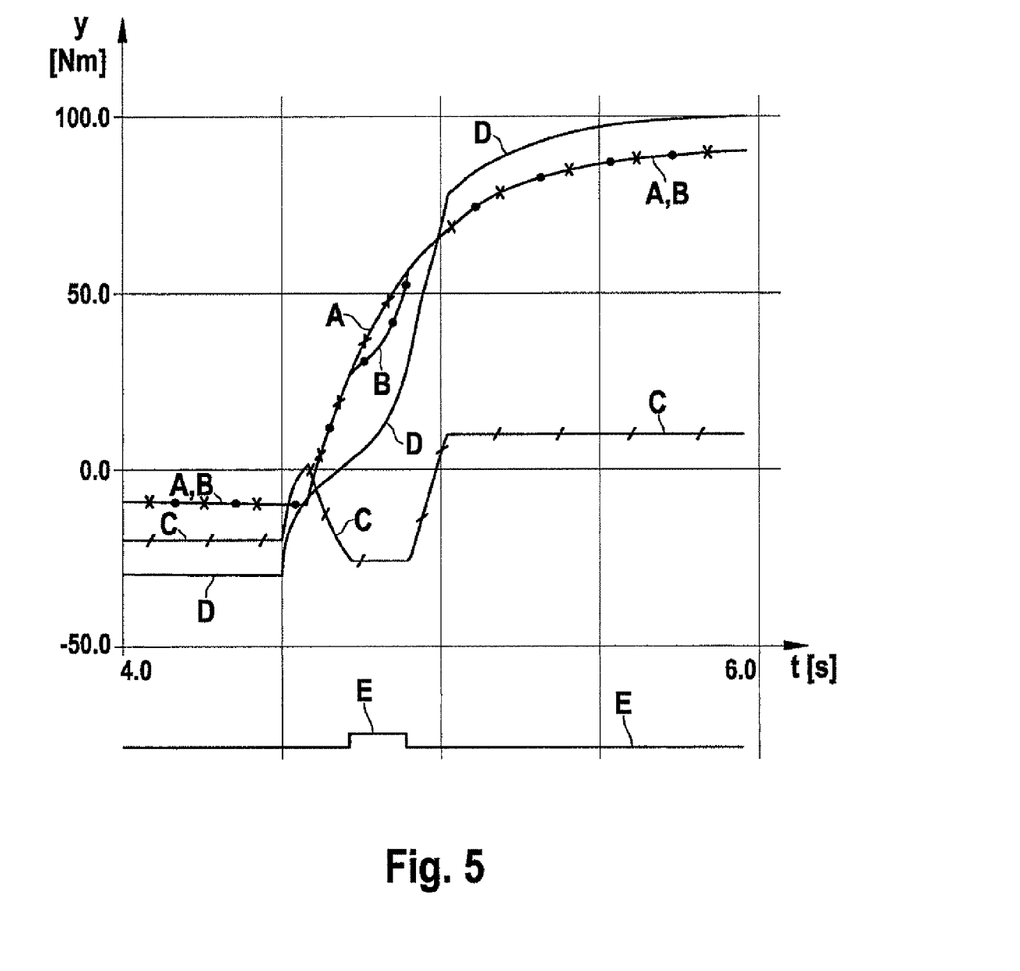
FIG. 5 shows simulation results of a calculation using a reference-forming element of the present invention.

FIG. 5 shows simulation results for a jump in unfiltered combined setpoint torque trqDes from −30 Nm to 100 Nm at time t=4.5 seconds (cf. FIG. 2). On this basis, operating strategy 12 or the distribution in this example produces a jump in lead setpoint torque trqLeadEng from −10 Nm to 90 Nm as well as a jump in unfiltered setpoint torque trgDesElmUnFlt of electric machine 20 from −20 Nm to 10 Nm at time 4.5 sec.

The transmission of lead setpoint torque trqLeadEng onto base torque trqBs is described using the series connection of a dead-time element and a time-delay element of the first order (PT1), base torque trqBs (curve A) following the lead setpoint torque with a corresponding delay. Immediately after the jump, reference-forming element 10 increases setpoint torque trqDesElm (curve C), which results in a quick response of actual torque trq (curve D) to the driver input (combined setpoint torque trqDes). This occurs already at a time at which base torque trqBs does not yet display any reaction as a result of the dead time. The method according to the present invention thus improves the response of the hybrid vehicle with respect to a comparable, non-hybridized mass-produced vehicle.

As a consequence of the great gradient limitation by trgLimGrad in the range of the zero crossing, there is a smooth transition from the overrun state (trq<0) to the acceleration state (trq>0), initially connected with a reduction of setpoint torque trqDesEim. Torque limit trqElmMin of electric machine 20 is −25 Nm, the control range not being sufficient for forming the zero crossing exclusively using electric machine 20. For this reason, there is a temporary ignition angle intervention (stlARls=true) (curve E), the difference between base torque trqBs (curve A) and setpoint torque trqDesEng (curve B) of combustion engine 18 during the ignition angle intervention corresponding to differential torque trqDeclARls.

The example method according to the present invention allows for a precise formation of actual torque trq even in case of a greatly varying dynamics of the slow path (the transmission of lead setpoint torque trqLeadEng onto base torque trqBs), which is a function of the operating point of combustion engine 18 (torque, rotational speed, intake manifold pressure etc.).

The use of electric machine 20 for reference formation minimizes ignition angle interventions, which may result, in addition to efficiency factor losses at high loads, also in temperature spikes in the catalytic converter and may limit its service life.

What is claimed is:

1. A method for operating a hybrid drive having at least one first and one second drive-connected drive machine, in which an actual torque of at least one of the drive machines is influenced by a reference-forming element, the method comprising:
forming, from an unfiltered combined setpoint torque, an unfiltered first setpoint torque for a slow influencing path for the first drive machine;
forming, from the unfiltered combined setpoint torque, a second setpoint torque for a fast influencing path for the first drive machine; and
generating a third setpoint torque for a fast influencing path of the second drive machine;
wherein the first setpoint torque is obtained from the unfiltered combined setpoint torque before the unfiltered combined setpoint torque is processed in the reference-forming element.

2. The method as recited in claim 1, wherein an unfiltered setpoint torque of the second drive machine and the unfiltered first setpoint torque of the first drive machine are supplied to the reference-forming element as input variables.

3. The method as recited in claim 2, wherein the unfiltered first setpoint torque of the first drive machine leaves the reference-forming element unmodified.

4. The method as recited in claim 2, wherein the unfiltered first setpoint torque of the first drive machine leaves the reference-forming element modified.

5. The method as recited in claim 1, wherein the reference-forming element ascertains the second setpoint torque for the fast path of the first drive machine and the setpoint torque of the second drive machine by taking into account a current base torque signaled by the first drive machine.

6. The method as recited in claim 1, wherein, if no fast intervention in the first drive machine is required, the second setpoint torque for the first drive machine is set to be equal to a base torque.

7. The method as recited in claim 1, wherein, if a fast intervention in the first drive machine is required, the second setpoint torque for the first drive machine results as a sum of a base torque and a differential torque that is characteristic of an influence of the fast influencing path.

8. The method as recited in claim 1, wherein the reference-forming element specifies the setpoint torque for the fast path of the first drive machine and the setpoint torque of the second drive machine in such a way that a gradient of an actual torque lies within admissible thresholds.

9. The method as recited in claim 8, wherein, in the range of a zero crossing of an actual torque, thresholds for limiting gradient are selected to be small.

10. The method as recited in claim 1, wherein the setpoint torque for the second drive machine is selected to be such that the second setpoint torque of the first drive machine becomes equal to the base torque.

11. The method as recited in claim 10, wherein, when a torque of the second drive machine is limited, the first drive machine is influenced on the fast influencing path.

12. The method as recited in claim 1, wherein an ignition angle intervention occurs without limiting a torque of the second drive machine.

* * * * *